(12) United States Patent
Ito et al.

(10) Patent No.: US 11,267,716 B2
(45) Date of Patent: Mar. 8, 2022

(54) SOLID-STATE ELECTROLYTE AND ALL-SOLID-STATE BATTERY

(71) Applicant: Murata Manufacturing Co., Ltd., Nagaokakyo (JP)

(72) Inventors: Akisuke Ito, Nagaokakyo (JP); Makoto Yoshioka, Nagaokakyo (JP); Takeo Ishikura, Nagaokakyo (JP); Ryohei Takano, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 532 days.

(21) Appl. No.: 16/235,376

(22) Filed: Dec. 28, 2018

(65) Prior Publication Data

US 2019/0135644 A1 May 9, 2019

Related U.S. Application Data

(63) Continuation of application No. PCT/JP2017/031437, filed on Aug. 31, 2017.

(30) Foreign Application Priority Data

Sep. 20, 2016 (JP) .............................. JP2016-183551

(51) Int. Cl.
*C01B 33/32* (2006.01)
*C04B 35/447* (2006.01)
(Continued)

(52) U.S. Cl.
CPC .......... *C01B 33/325* (2013.01); *C04B 35/447* (2013.01); *H01M 10/054* (2013.01);
(Continued)

(58) Field of Classification Search
CPC .............. H01M 10/052; H01M 10/054; C04B 2235/3206; C04B 2235/3225; C04B 2235/3201
See application file for complete search history.

(56) References Cited

U.S. PATENT DOCUMENTS 8,246,863 B2 8/2012 Balagopal et al.
9,853,322 B2 12/2017 Kawaji et al.
(Continued)

FOREIGN PATENT DOCUMENTS

JP H0357060 A 3/1991
JP 2012238545 A 12/2012
(Continued)

OTHER PUBLICATIONS

Wang et al., "Solid Phase Synthesis and Characterization of $Na_3Zr_{2-y}Nb_{.8y}Si_2PO_{12}$ System," Solid State Ionics, vol. 51, 1992, pp. 97-100.
(Continued)

*Primary Examiner* — Cynthia H Kelly
*Assistant Examiner* — Monique M Wills
(74) *Attorney, Agent, or Firm* — Arent Fox LLP

(57) ABSTRACT

A NaSICON-type solid-state electrolyte that contains Na as a conducting species, Zr, M, Si, P, and O, where M is at least one element selected from Mg, V, and Nb. The NaSICON-type solid-state electrolyte has a composition in which a molar ratio of M to Zr (M/Zr) is less than 0.2.

20 Claims, 1 Drawing Sheet

(51) Int. Cl.
| | |
|---|---|
| *H01M 10/0562* | (2010.01) |
| *H01M 10/054* | (2010.01) |
| *H01M 10/0585* | (2010.01) |
| *H01B 1/08* | (2006.01) |

(52) U.S. Cl.
CPC ... *H01M 10/0562* (2013.01); *H01M 10/0585* (2013.01); *C04B 2235/3201* (2013.01); *C04B 2235/3206* (2013.01); *C04B 2235/3225* (2013.01); *C04B 2235/3239* (2013.01); *C04B 2235/3244* (2013.01); *C04B 2235/3251* (2013.01); *C04B 2235/3418* (2013.01); *C04B 2235/6567* (2013.01); *H01B 1/08* (2013.01)

(56) References Cited

U.S. PATENT DOCUMENTS

| | | | |
|---|---|---|---|
| 2010/0331170 | A1 | 12/2010 | Balagopal et al. |
| 2011/0104526 | A1 | 5/2011 | Boxley et al. |
| 2014/0363706 | A1 | 12/2014 | Boxley et al. |
| 2015/0044575 | A1 | 2/2015 | Kawaji et al. |
| 2015/0364787 | A1* | 12/2015 | Zhang ............... H01B 1/08 429/321 |
| 2017/0084970 | A1* | 3/2017 | Balagopal ............ F01K 25/12 |

FOREIGN PATENT DOCUMENTS

| | | |
|---|---|---|
| JP | 2012531709 A | 12/2012 |
| JP | 2013510391 A | 3/2013 |
| JP | 2015035334 A | 2/2015 |

OTHER PUBLICATIONS

Krok, "Influence of Sintering Conditions on Chemical Composition of Nasicon," Solid State Ionics, vol. 24, 1987, pp. 21-28.

Krok et al., "On Some Properties of Nasicon Doped With $M_gO$ and $C_oO$," Solid State Ionics, vol. 36, 1989, pp. 251-254.

Yu et al., "Phase Relationship and Electrical Behavior of $Na_3Zr_{2-x}Mg_xSi_{2-2x}P_{1+2}O_{12}$ System," Journal of the Chinese Silicate Society, vol. 16 No. 4, Aug. 1988, pp. 339-344 (English-Abstract provided).

Cai et al., "Preparation and Characterization of Sodium Fast Ion Conductors of $Na_{1+x}Zr_{2-y}V_{.8y}Si_xP_{3-x}O_{12}$ System," vol. 29 No. 3, 1998, pp. 300-303 (English-Abstract provided).

Wang et al., "Solid Phase Synthesis and Characterization of Sodium Fast Ion Conductors of $Na_{3-x}Zr_{2-x}V_xSi_2PO_{12}$ System," vol. 19 No. 1, Mar. 1991, pp. 54-57 (English-Abstract provided).

International Search Report issued in PCT/JP2017/031437, dated Nov. 7, 2017.

Written Opinion of the International Searching Authority issued in PCT/JP2017/031437, dated Nov. 7, 2017.

Wang et al.; "Solid Phase Synthesis and Characterization of Sodium Fast Ion Conductors of $Na_{3-x}Zr_{2-x}V_xSi_2PO_{12}$ System" Journal of Fuzhou University (Natural Science), 1991, vol. 19, No. 1, pp. 54-57. (English translation of abstract provided).

\* cited by examiner

SOLID-STATE ELECTROLYTE AND ALL-SOLID-STATE BATTERY

CROSS REFERENCE TO RELATED APPLICATIONS

The present application is a continuation of International application No. PCT/JP2017/031437, filed Aug. 31, 2017, which claims priority to Japanese Patent Application No. 2016-183551, filed Sep. 20, 2016, the entire contents of each of which are incorporated herein by reference.

FIELD OF THE INVENTION

The present invention relates to a solid-state electrolyte and an all-solid-state battery.

BACKGROUND OF THE INVENTION

Conventionally, all-solid-state batteries have been known as secondary batteries that have excellent reliability and safety. For example, Patent Document 1 describes a NaSICON-type solid-state electrolyte having Na as a conducting species.

Patent Document 1: Japanese Translation of PCT International Application Publication No. 2012-531709

SUMMARY OF THE INVENTION

For example, as described in Patent Document 1, there is a demand for an all-solid-state battery including a solid-state electrolyte that improves the ionic conductivity of the solid-state electrolyte and improves the battery characteristics of the all-solid-state battery.

A main object of the present invention is to improve the ionic conductivity of the solid-state electrolyte and to improve the battery characteristics of the all-solid-state battery.

A solid-state electrolyte according to the present invention is a NaSICON-type solid-state electrolyte having Na as a conducting species. The solid-state electrolyte according to the present invention contains Na, Zr, M, Si, P, and O (where M is at least one element selected from the group consisting of Mg, V, and Nb). The solid-state electrolyte has a composition in which a molar ratio of M to Zr (M/Zr) is less than 0.2. With such a configuration, the solid-state electrolyte according to the present invention makes it is possible to realize a solid-state electrolyte layer having high ionic conductivity. Consequently, the solid-state electrolyte according to the present invention results in an all-solid-state battery having excellent battery characteristics.

It is preferable that the solid-state electrolyte according to the present invention further contain Y.

The solid-state electrolyte according to the present invention is preferably represented by the formula $Na_{3+x}(Zr_{1-y}Y_y)_{2-z}M_zSi_2PO_{12}$ (where M is at least one element selected from the group consisting of Mg, V, and Nb, x is more than −0.2 and less than 0.8, y is more than 0 and equal to or less than 0.12, and z is more than 0 and equal to or less than 0.3).

In the solid-state electrolyte according to the present invention, it is preferable that z be 0.05 to 0.3.

In the solid-state electrolyte according to the present invention, it is more preferable that z be 0.1 to 0.3.

In the solid-state electrolyte according to the present invention, it is most preferable that z be 0.1 to 0.15.

An all-solid-state battery according to the present invention includes a solid-state electrolyte, a positive electrode, and a negative electrode. The solid-state electrolyte layer includes the solid-state electrolyte described herein. The positive electrode is joined to one surface of the solid-state electrolyte layer by sintering. The negative electrode is joined to the other surface of the solid-state electrolyte layer by sintering.

According to the present invention, it is possible to improve the ionic conductivity of the solid-state electrolyte and to improve the battery characteristics of the all-solid-state battery.

DETAILED DESCRIPTION OF THE INVENTION

Hereinafter, an example of preferred embodiments of the present invention will be described. However, the following embodiments are merely examples. The present invention is not limited to the following embodiments at all.

Figure 1:
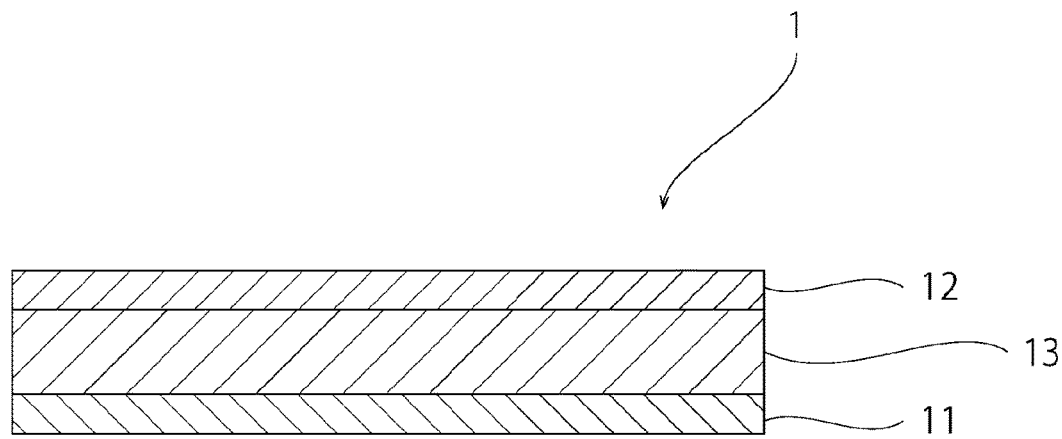
FIG. 1 is a schematic cross-sectional view of an all-solid-state battery according to an embodiment of the present invention.
Figure 2:
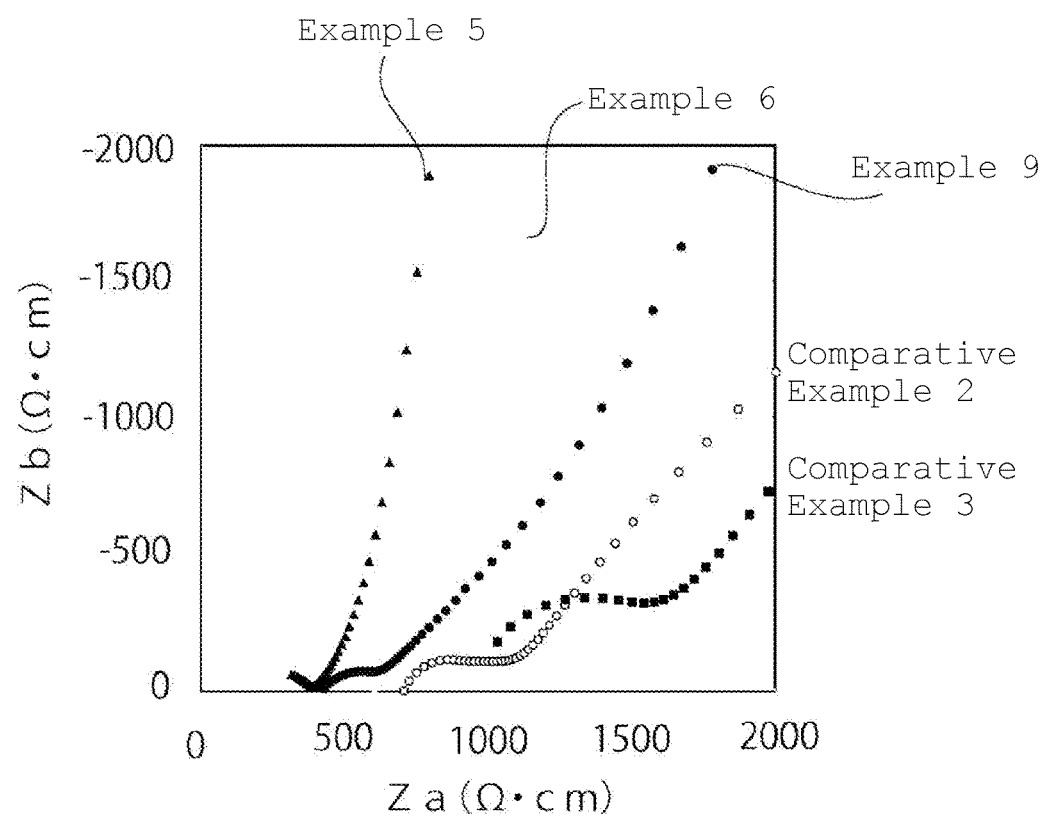
FIG. 2 is a Nyquist plot of the solid-state electrolytes produced in Comparative Examples 2 and 4 and Examples 5, 6, and 9.

FIG. 1 is a schematic cross-sectional view of an all-solid-state battery 1 according to the present embodiment. As shown in FIG. 1, the battery includes a positive electrode 11, a negative electrode 12, and a solid-state electrolyte layer 13.

The positive electrode 11 includes positive electrode active material particles. Examples of the positive electrode active material particles to be preferably used include sodium-containing phosphate compound particles having a NaSICON-type structure, and sodium-containing layered oxide particles. Specific examples of the sodium-containing phosphate compound having a NaSICON-type structure to be preferably used include $Na_3V_2(PO_4)_3$. Specific examples of the sodium-containing layered oxide particles to be preferably used include $NaFeO_2$ and $NaNi_{1/3}Co_{1/3}Fe_{1/3}O_2$. Only one kind of these positive electrode active material particles may be used, or a plurality of kinds thereof may be mixed and used.

The positive electrode 11 may further include a solid-state electrolyte. The kind of solid-state electrolyte included in the positive electrode 11 is not particularly limited, and it is preferable to include the same kind of solid-state electrolyte as the solid-state electrolyte contained in the solid-state electrolyte layer 13. In this case, the adhesion strength between the solid-state electrolyte layer 13 and the positive electrode 11 can be improved.

The negative electrode 12 includes negative electrode active material particles. Specific examples of the negative electrode active material particles to be preferably used include particles of a compound represented by MOx (M is at least one selected from the group consisting of Ti, Sn, and Fe, and X is equal to or more than 0.9 and equal to or less than 2.5), hardly-graphitizable carbon-sodium compound particles, sodium alloy particles, sodium-containing phosphate compound particles having a NaSICON-type structure, and lithium-containing oxide particles having a spinel-type structure. Specific examples of sodium alloys to be preferably used include Na—Sn alloys. Specific examples of the sodium-containing phosphate compound having a NaSICON-type structure to be preferably used include $Na_3V_2$ ($PO_4$)$_3$. Specific examples of the lithium-containing oxide having a spinel-type structure to be preferably used include $Li_4Ti_5O_{12}$. Only one kind of these negative electrode active material particles may be used, or a plurality of kinds thereof may be mixed and used.

The negative electrode 12 may further include a solid-state electrolyte. The kind of solid-state electrolyte included in the negative electrode 12 is not particularly limited, and it is preferable to include the same kind of solid-state electrolyte as the solid-state electrolyte contained in the solid-state electrolyte layer 13. In this case, the adhesion strength between the solid-state electrolyte layer 13 and the negative electrode 12 can be improved.

The solid-state electrolyte layer 13 is disposed between the positive electrode 11 and the negative electrode 12. That is, the positive electrode 11 is disposed on one side of the solid-state electrolyte layer 13, and the negative electrode 12 is disposed on the other side thereof. Each of the positive and negative electrodes 11 and 12 is joined to the solid-state electrolyte layer 13 by sintering. In other words, the positive electrode 11, the solid-state electrolyte layer 13, and the negative electrode 12 are an integrated sintered body. The solid-state electrolyte layer 13 includes a NaSICON-type solid-state electrolyte having Na as a conducting species. More specifically, the solid-state electrolyte layer 13 contains Na, Zr, M, Si, P, and O (M is at least one element selected from the group consisting of Mg, V, and Nb), and contains a solid-state electrolyte having a composition in which a molar ratio of M to Zr (M/Zr) is less than 0.2. Thus, the solid-state electrolyte layer 13 according to the present embodiment has high ionic conductivity. Therefore, the all-solid-state battery 1 having the solid-state electrolyte layer 13 is excellent in battery characteristics such as power density. From the viewpoint of realizing higher ionic conductivity, it is preferable to use a solid-state electrolyte satisfying the condition that M/Zr is less than 0.1. However, when the molar ratio of M to Zr is too small, the effect of adding M may not be obtained in some cases. Accordingly, the molar ratio of M to Zr (M/Zr) is preferably more than 0.02, and more preferably more than 0.05.

It is preferable that a solid-state electrolyte 13 further contain Y. In the case where the solid-state electrolyte 13 contains Y, the ionic conductivity of the solid-state electrolyte 13 can be further increased.

For example, the solid-state electrolyte 13 is preferably represented by the formula $Na_{3+x}(Zr_{1-y}Y_y)_{2-z}M_zSi_2PO_{12}$ (where M is at least one element selected from the group consisting of Mg, V, and Nb, x is more than −0.2 and less than 0.8, y is more than 0 and equal to or less than 0.12, and z is more than 0 and equal to or less than 0.3). In this case, as shown in the following examples, the ionic conductivity of the solid-state electrolyte 13 can be further increased.

In the formula $Na_{3+x}(Zr_{1-y}Y_y)_{2-z}M_zSi_2PO_{12}$, z is preferably 0.05 to 0.3, z is more preferably 0.1 to 0.3, and z is still more preferably 0.1 to 0.15. When z is in this range, the ionic conductivity can be further increased as shown in the following examples.

Note that the compound represented by the formula $Na_{3+x}(Zr_{1-y}Y_y)_{2-z}M_zSi_2PO_{12}$ has 12 oxygen atoms, but regarding the number of oxygen atoms contained in the compound represented by this formula, the stoichiometric ratio of O does not need to be strictly 12 from the viewpoint of maintaining the neutrality between the positive and negative charges. In the present invention, the compound represented by the formula includes compounds containing 7 mol or more and 15 mol or less of oxygen.

Hereinafter, the present invention will be described in more detail based on specific examples; however, the present invention is not limited to the following examples at all, and may be modified as appropriate without changing the gist thereof.

Comparative Example 1

Raw materials such as sodium phosphate dodecahydrate ($Na_3PO_4 \cdot 12H_2O$), sodium carbonate ($Na_2CO_3$), zirconium oxide ($ZrO_2$), and silicon dioxide ($SiO_2$) were weighed so as to have the composition for obtaining the formula satisfying the conditions shown in Table 1. Next, the raw material powders thus weighed, ethanol, and cobblestone (φ2 mm) were enclosed in a polyethylene pot made of polyethylene and rotated on a pot rack to mix the raw materials. Then, ethanol was removed by heating the mixed raw material on a hot plate heated to 90° C. Thereafter, the mixed raw material was fired in an air atmosphere at 1100° C. for 8 hours to remove volatile components, and thus a pre-fired product was obtained. Then, the pre-fired product, ethanol, and cobblestone (φ2 mm) were enclosed in a pot made of zirconia, and the pot was rotated in a planetary ball mill to pulverize the pre-fired product. Thereafter, the pre-fired product was placed on a hot plate at 90° C. and heated to remove the ethanol, and thus a pre-fired pulverized powder was obtained. Then, the resulting pre-fired pulverized powder was molded into a tablet having a diameter φ of 10 mm and a thickness of 500 μm to 1000 μm under a pressure of 50 kN/cm². Then, the tablet was fired in an air atmosphere at 1100° C. to 250° C. for 10 hours to obtain a solid-state electrolyte tablet having the composition of Comparative Example 1 shown in Table 1 below.

Example 1

A solid-state electrolyte tablet having the composition of Example 1 described in Table 1 below was produced in the same manner as in Comparative Example 1 except that raw materials such as sodium phosphate dodecahydrate ($Na_3PO_4 \cdot 12H_2O$), sodium carbonate ($Na_2CO_3$), zirconium oxide ($ZrO_2$), silicon dioxide ($SiO_2$), and magnesium oxide (MgO) were weighed so as to have the composition for obtaining the formula satisfying the conditions shown in Table 1.

Example 2

A solid-state electrolyte tablet having the composition of Example 2 described in Table 1 below was produced in the same manner as in Comparative Example 1 except that raw materials such as sodium carbonate ($Na_2CO_3$), zirconium oxide ($ZrO_2$), ammonium dihydrogenphosphate ($NH_4H_2PO_4$), silicon dioxide ($SiO_2$), and vanadium oxide ($V_2O_5$) were appropriately weighed so as to have the composition for obtaining the formula satisfying the conditions shown in Table 1.

Example 3

A solid-state electrolyte tablet having the composition of Example 3 described in Table 1 below was produced in the same manner as in Comparative Example 1 except that raw materials such as sodium carbonate ($Na_2CO_3$), zirconium oxide ($ZrO_2$), ammonium dihydrogenphosphate ($NH_4H_2PO_4$), silicon dioxide ($SiO_2$), and niobium pentoxide ($Nb_2O_5$) were appropriately weighed so as to have the composition for obtaining the formula satisfying the conditions shown in Table 1.

Comparative Example 2

A solid-state electrolyte tablet having the composition of Comparative Example 2 described in Table 2 below was produced in the same manner as in Comparative Example 1 except that raw materials such as sodium phosphate dodecahydrate ($Na_3PO_4.12H_2O$), sodium carbonate ($Na_2CO_3$), zirconium oxide ($ZrO_2$), silicon dioxide ($SiO_2$), yttrium oxide ($Y_2O_3$), and yttrium stabilized zirconia (YSZ) were appropriately weighed so as to have the composition for obtaining the formula satisfying the conditions shown in Table 2. FIG. 1 shows the Nyquist plot of the obtained solid-state electrolyte tablet.

Example 4

A solid-state electrolyte tablet having the composition of Example 4 described in Table 2 below was produced in the same manner as in Comparative Example 1 except that raw materials such as sodium phosphate dodecahydrate ($Na_3PO_4.12H_2O$), sodium carbonate ($Na_2CO_3$), zirconium oxide ($ZrO_2$), silicon dioxide ($SiO_2$), yttrium oxide ($Y_2O_3$), yttrium stabilized zirconia (YSZ), and magnesium oxide (MgO) were appropriately weighed so as to have the composition for obtaining the formula satisfying the conditions shown in Table 2.

Example 5

A solid-state electrolyte tablet having the composition of Example 5 described in Table 2 below was produced in the same manner as in Comparative Example 1 except that raw materials such as sodium phosphate dodecahydrate ($Na_3PO_4.12H_2O$), sodium carbonate ($Na_2CO_3$), zirconium oxide ($ZrO_2$), silicon dioxide ($SiO_2$), yttrium oxide ($Y_2O_3$), yttrium stabilized zirconia (YSZ), and vanadium pentoxide ($V_2O_5$) were appropriately weighed so as to have the composition for obtaining the formula satisfying the conditions shown in Table 2. FIG. 1 shows the Nyquist plot of the obtained solid-state electrolyte tablet.

Example 6

A solid-state electrolyte tablet having the composition of Example 6 described in Table 2 below was produced in the same manner as in Comparative Example 1 except that raw materials such as sodium phosphate dodecahydrate ($Na_3PO_4.12H_2O$), sodium carbonate ($Na_2CO_3$), zirconium oxide ($ZrO_2$), silicon dioxide ($SiO_2$), yttrium oxide ($Y_2O_3$), yttrium stabilized zirconia (YSZ), and niobium pentoxide ($Nb_2O_5$) were appropriately weighed so as to have the composition for obtaining the formula satisfying the conditions shown in Table 2. FIG. 1 shows the Nyquist plot of the obtained solid-state electrolyte tablet.

Example 7

A solid-state electrolyte tablet having the composition of Example 7 described in Table 3 below was produced in the same manner as in Comparative Example 1 except that raw materials such as sodium phosphate dodecahydrate ($Na_3PO_4.12H_2O$), sodium carbonate ($Na_2CO_3$), zirconium oxide ($ZrO_2$), silicon dioxide ($SiO_2$), yttrium oxide ($Y_2O_3$), yttrium stabilized zirconia (YSZ), and magnesium oxide (MgO) were appropriately weighed so as to have the composition for obtaining the formula satisfying the conditions shown in Table 3.

Example 8

A solid-state electrolyte tablet having the composition of Example 8 described in Table 3 below was produced in the same manner as in Comparative Example 1 except that raw materials such as sodium phosphate dodecahydrate ($Na_3PO_4.12H_2O$), sodium carbonate ($Na_2CO_3$), zirconium oxide ($ZrO_2$), silicon dioxide ($SiO_2$), yttrium oxide ($Y_2O_3$), yttrium stabilized zirconia (YSZ), and magnesium oxide (MgO) were appropriately weighed so as to have the composition for obtaining the formula satisfying the conditions shown in Table 3.

Example 9

A solid-state electrolyte tablet having the composition of Example 9 described in Table 3 below was produced in the same manner as in Comparative Example 1 except that raw materials such as sodium phosphate dodecahydrate ($Na_3PO_4.12H_2O$), sodium carbonate ($Na_2CO_3$), zirconium oxide ($ZrO_2$), silicon dioxide ($SiO_2$), yttrium oxide ($Y_2O_3$), yttrium stabilized zirconia (YSZ), and magnesium oxide (MgO) were appropriately weighed so as to have the composition for obtaining the formula satisfying the conditions shown in Table 3. FIG. 1 shows the Nyquist plot of the obtained solid-state electrolyte tablet.

Example 10

A solid-state electrolyte tablet having the composition of Example 10 described in Table 3 below was produced in the same manner as in Comparative Example 1 except that raw materials such as sodium phosphate dodecahydrate ($Na_3PO_4.12H_2O$), sodium carbonate ($Na_2CO_3$), zirconium oxide ($ZrO_2$), silicon dioxide ($SiO_2$), yttrium oxide ($Y_2O_3$), yttrium stabilized zirconia (YSZ), and magnesium oxide (MgO) were appropriately weighed so as to have the composition for obtaining the formula satisfying the conditions shown in Table 3.

Comparative Example 3

A solid-state electrolyte tablet having the composition of Comparative Example 3 described in Table 3 below was produced in the same manner as in Comparative Example 1 except that raw materials such as sodium phosphate dodecahydrate ($Na_3PO_4.12H_2O$), sodium carbonate ($Na_2CO_3$), zirconium oxide ($ZrO_2$), silicon dioxide ($SiO_2$), yttrium oxide ($Y_2O_3$), yttrium stabilized zirconia (YSZ), and magnesium oxide (MgO) were appropriately weighed so as to have the composition for obtaining the formula satisfying the conditions shown in Table 3. FIG. 1 shows the Nyquist plot of the obtained solid-state electrolyte tablet.

(Evaluation of Ionic Conductivity of Solid-State Electrolyte)

The ionic conductivity of the solid-state electrolyte tablet produced in each of the Examples 1 to 10 and Comparative Examples 1 to 3 was measured in the following manner.

Specifically, after a platinum (Pt) layer as a current collector layer was formed on both sides of the solid-state electrolyte tablet by sputtering, the solid-state electrolyte tablet was dried at 100° C. to remove moisture, and sealed with a 2032 type coin cell. The ionic conductivity was calculated by measuring the AC impedance with respect to the sealed cell. The AC impedance was measured using a frequency response analyzer (FRA) (manufactured by Solartron) in the frequency range of 0.1 MHz to 1 MHz with an amplitude of ±10 mV at a temperature of 25° C.

TABLE 1

|  | M | x | y | z | M/Zr (Molar ratio) | Formula | Ionic conductivity ($\times 10^{-4}$ S/cm) |
|---|---|---|---|---|---|---|---|
| Comparative Example 1 |  | 0.00 |  |  |  | $Na_3Zr_2Si_2PO_{12}$ | 1.4 |
| Example 1 | Mg | 0.20 | 0.00 | 0.10 | 0.05 | $Na_{3.20}Zr_{1.90}Mg_{0.10}Si_2PO_{12}$ | 4.8 |
| Example 2 | V | −0.10 | 0.00 | 0.10 | 0.05 | $Na_{2.90}Zr_{1.90}V_{0.10}Si_2PO_{12}$ | 2.6 |
| Example 3 | Nb | −0.10 | 0.00 | 0.10 | 0.05 | $Na_{2.90}Zr_{1.90}Nb_{0.10}Si_2PO_{12}$ | 2.9 |

As shown in Table 1, the ionic conductivity of the solid-state electrolyte produced in each of the Examples 1 to 3 was $2.6 \times 10^{-4}$ S/cm to $4.8 \times 10^{-4}$ S/cm, both of which were higher than the ionic conductivity of the solid-state electrolyte produced in Comparative Example 1.

TABLE 2

|  | M | x | y | z | M/Zr (Molar ratio) | Formula | Ionic conductivity ($\times 10^{-4}$ S/cm) |
|---|---|---|---|---|---|---|---|
| Comparative Example 2 |  | 0.12 | 0.06 | 0.00 |  | $Na_{3.12}Zr_{1.88}Y_{0.12}Si_2PO_{12}$ | 11 |
| Example 4 | Mg | 0.32 | 0.06 | 0.10 | 0.06 | $Na_{3.32}Zr_{1.79}Y_{0.11}Mg_{0.10}Si_2PO_{12}$ | 14 |
| Example 5 | V | 0.02 | 0.06 | 0.10 | 0.06 | $Na_{3.02}Zr_{1.79}Y_{0.11}V_{0.10}Si_2PO_{12}$ | 26 |
| Example 6 | Nb | 0.02 | 0.06 | 0.10 | 0.06 | $Na_{3.02}Zr_{1.79}Y_{0.11}Nb_{0.10}Si_2PO_{12}$ | 15 |

As shown in Table 2, the ionic conductivity of the solid-state electrolyte produced in each of the Examples 4 to 6 was $1.4 \times 10^{-3}$ S/cm to $2.6 \times 10^{-3}$ S/cm, both of which were higher than the ionic conductivity of the solid-state electrolyte produced in Comparative Example 2.

TABLE 3

|  | M | x | y | z | M/Zr (Molar ratio) | Formula | Ionic conductivity ($\times 10^{-4}$ S/cm) |
|---|---|---|---|---|---|---|---|
| Comparative Example 2 |  | 0.12 | 0.06 |  |  | $Na_{3.12}Zr_{1.88}Y_{0.12}Si_2PO_{12}$ | 11 |
| Example 7 | Mg | 0.22 | 0.06 | 0.05 | 0.03 | $Na_{3.22}Zr_{1.83}Y_{0.12}Mg_{0.05}Si_2PO_{12}$ | 12 |
| Example 8 | Mg | 0.32 | 0.06 | 0.10 | 0.06 | $Na_{3.32}Zr_{1.79}Y_{0.11}Mg_{0.10}Si_2PO_{12}$ | 14 |
| Example 9 | Mg | 0.42 | 0.06 | 0.15 | 0.09 | $Na_{3.42}Zr_{1.74}Y_{0.11}Mg_{0.15}Si_2PO_{12}$ | 16 |
| Example 10 | Mg | 0.72 | 0.06 | 0.30 | 0.19 | $Na_{3.72}Zr_{1.60}Y_{0.10}Mg_{0.30}Si_2PO_{12}$ | 13 |
| Comparative Example 3 | Mg | 1.12 | 0.06 | 0.50 | 0.35 | $Na_{4.12}Zr_{1.41}Y_{0.09}Mg_{0.50}Si_2PO_{12}$ | 6.3 |

As shown in Table 3, the ionic conductivity of the solid-state electrolyte produced in each of the Examples 7 to 10 was $1.2 \times 10^{-3}$ S/cm to $1.6 \times 10^{-3}$ S/cm, both of which were higher than the ionic conductivity of the solid-state electrolyte produced in Comparative Example 3.

DESCRIPTION OF REFERENCE SYMBOLS

1: All-solid-state battery

11: Positive electrode

12: Negative electrode

13: Solid-state electrolyte layer

The invention claimed is:

1. A NaSICON solid-state electrolyte comprising:
Na as a conducting species;
Zr;
M;
Si;
P; and
O, wherein M is at least one element selected from Mg, V, and Nb, and
wherein the NaSICON solid-state electrolyte has a composition in which a molar ratio of M to Zr (M/Zr) is less than 0.2.

2. The NaSICON solid-state electrolyte according to claim 1, wherein the molar ratio of M to Zr (M/Zr) is less than 0.1.

3. The NaSICON solid-state electrolyte according to claim 1, wherein the molar ratio of M to Zr (M/Zr) is more than 0.02 and less than 0.2.

4. The NaSICON solid-state electrolyte according to claim 1, wherein the molar ratio of M to Zr (M/Zr) is more than 0.05 and less than 0.2.

5. A NaSICON solid-state electrolyte comprising:
Na as a conducting species;
Zr;
M;

Si;
P;
O; and
Y,
wherein M is at least one element selected from Mg, V, and Nb, and
wherein the NaSICON solid-state electrolyte has a composition in which a molar ratio of M to Zr (M/Zr) is less than 0.2.

6. The NaSICON solid-state electrolyte according to claim 5, wherein the NaSICON solid-state electrolyte is represented by the formula $Na_{3+x}(Zr_{1-y}Y_y)_{2-z}M_zSi_2PO_{12}$, wherein x is more than −0.2 and less than 0.8, y is more than 0 and equal to or less than 0.12, and z is more than 0 and equal to or less than 0.3.

7. The NaSICON solid-state electrolyte according to claim 5, wherein z is 0.05 to 0.3.

8. The NaSICON solid-state electrolyte according to claim 5, wherein z is 0.1 to 0.3.

9. The NaSICON solid-state electrolyte according to claim 5, wherein z is 0.1 to 0.15.

10. A NaSICON solid-state electrolyte comprising:
Na as a conducting species;
Zr;
M;
Si;
P; and
O,
wherein M is at least one element selected from Mg, V, and Nb,
wherein the NaSICON solid-state electrolyte has a composition in which a molar ratio of M to Zr (M/Zr) is less than 0.2, and
wherein the NaSICON solid-state electrolyte is represented by the formula $Na_{3+x}(Zr_{1-y}Y_y)_{2-z}M_zSi_2PO_{12}$, wherein x is more than −0.2 and less than 0.8, y is more than 0 and equal to or less than 0.12, and z is more than 0 and equal to or less than 0.3.

11. The NaSICON solid-state electrolyte according to claim 10, wherein z is 0.05 to 0.3.

12. The NaSICON solid-state electrolyte according to claim 10, wherein z is 0.1 to 0.3.

13. The NaSICON solid-state electrolyte according to claim 10, wherein z is 0.1 to 0.15.

14. An all-solid-state battery comprising:
a solid-state electrolyte layer which includes the NaSICON solid-state electrolyte according to claim 1;
a positive electrode joined to a first surface of the solid-state electrolyte layer; and
a negative electrode joined to a second surface of the solid-state electrolyte layer.

15. The all-solid-state battery according to claim 14, wherein the molar ratio of M to Zr (M/Zr) is more than 0.02 and less than 0.2.

16. An all-solid-state battery comprising:
a solid-state electrolyte layer which includes the NaSICON solid-state electrolyte according to claim 5;
a positive electrode joined to a first surface of the solid-state electrolyte layer; and
a negative electrode joined to a second surface of the solid-state electrolyte layer.

17. An all-solid-state battery comprising:
a solid-state electrolyte layer which includes the NaSICON solid-state electrolyte according to claim 10;
a positive electrode joined to a first surface of the solid-state electrolyte layer; and
a negative electrode joined to a second surface of the solid-state electrolyte layer.

18. The all-solid-state battery according to claim 17, wherein z is 0.05 to 0.3.

19. The all-solid-state battery according to claim 17, wherein z is 0.1 to 0.3.

20. The all-solid-state battery according to claim 17, wherein z is 0.1 to 0.15.

* * * * *